United States Patent
Takagi et al.

(10) Patent No.: US 7,269,148 B2
(45) Date of Patent: Sep. 11, 2007

(54) SCHEME FOR ADAPTIVE CONTROL OF TRANSPORT LAYER CONNECTION IN COMMUNICATIONS VIA RADIO AND WIRE NETWORKS

(75) Inventors: Masahiro Takagi, Tokyo (JP); Noriyasu Kato, Kanagawa (JP); Keiji Tsunoda, Kanagawa (JP); Kumiko Nakakita, Kanagawa (JP); Katsuya Nounin, Kanagawa (JP); Mutsumu Serizawa, Tokyo (JP); Eiji Kamagata, Kanagawa (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1018 days.

(21) Appl. No.: 10/189,502

(22) Filed: Jul. 8, 2002

(65) Prior Publication Data

US 2002/0186680 A1    Dec. 12, 2002

Related U.S. Application Data

(62) Division of application No. 09/157,616, filed on Sep. 21, 1998, now Pat. No. 6,418,128.

(30) Foreign Application Priority Data

| Sep. 22, 1997 | (JP) | 9-257153 |
| Sep. 29, 1997 | (JP) | 9-264422 |
| Aug. 20, 1998 | (JP) | 10-233389 |

(51) Int. Cl.
*H04Q 7/32* (2006.01)

(52) U.S. Cl. .................................. 370/328; 455/550.1

(58) Field of Classification Search ............... 370/328, 370/331, 332, 333, 401, 465; 455/550.1, 455/455

See application file for complete search history.

(56) References Cited

U.S. PATENT DOCUMENTS 5,159,596 A    10/1992    Itoh (Continued)

FOREIGN PATENT DOCUMENTS

EP    0 766 427    4/1997

(Continued)

OTHER PUBLICATIONS

Ajay Bakre, et al., Proceedings of the International Conference on Distributed Computing Systems., vol. CONF. 15, pp. 136-143, "I-TCP: Indirect TCP for Mobile Hosts", May 30, 1995.

(Continued)

*Primary Examiner*—Min Jung
(74) *Attorney, Agent, or Firm*—Oblon, Spivak, McClelland, Maier & Neustadt, P.C.

(57) ABSTRACT

A communication scheme for improving the performance of communications utilizing the transport layer connection provided via a radio network, by enabling a control of the transport layer connection according to the radio communication state and property of the radio terminal, without changing implementation of the transport layer of a terminal connected to a wire network. The gateway device is provided with a control unit for controlling a connection in the radio transport layer protocol according an information regarding a radio communication state of the radio terminal device, where the information regarding the radio communication state of the radio terminal device is notified from either a radio base station device covering a radio service area in which the radio terminal device is located or a home location register for carrying out at least registration and management of the radio terminal device.

3 Claims, 7 Drawing Sheets

U.S. PATENT DOCUMENTS

| | | | |
|---|---|---|---|
| 5,224,098 A * | 6/1993 | Bird et al. | 709/233 |
| 5,457,680 A | 10/1995 | Kamm et al. | |
| 5,504,746 A * | 4/1996 | Meier | 370/256 |
| 5,894,478 A * | 4/1999 | Barzegar et al. | 370/401 |
| 5,911,123 A * | 6/1999 | Shaffer et al. | 455/554.1 |
| 5,933,784 A * | 8/1999 | Gallagher et al. | 455/552.1 |
| 6,067,534 A * | 5/2000 | Terho et al. | 706/2 |
| 6,230,010 B1 * | 5/2001 | Morris | 455/426.1 |
| 2003/0186706 A1 * | 10/2003 | Bergins et al. | 455/452.2 |
| 2005/0232213 A1 * | 10/2005 | Meier | 370/338 |

FOREIGN PATENT DOCUMENTS

| | | |
|---|---|---|
| JP | 5-83157 | 4/1993 |
| JP | 8-46643 | 2/1996 |
| JP | 8-242231 | 9/1996 |
| JP | 8-280064 | 10/1996 |
| JP | 9-55764 | 2/1997 |
| WO | WO97/08838 | 3/1997 |
| WO | WO97/13380 | 4/1997 |

OTHER PUBLICATIONS

Ajay Bakre, et al., IEEE Transactions of Computers, vol. 46, No. 3, pp. 260-278, "Implementation and Performance Evaluation of Indirect TCP", Mar. 1, 1997.

Ajay Bakre, et al., Mobile and Location-Independent Computing Symposium, pp. 11-24, "Handoff and System Support for Indirect TCP/IP", Apr. 10, 1995.

* cited by examiner

FIG.3

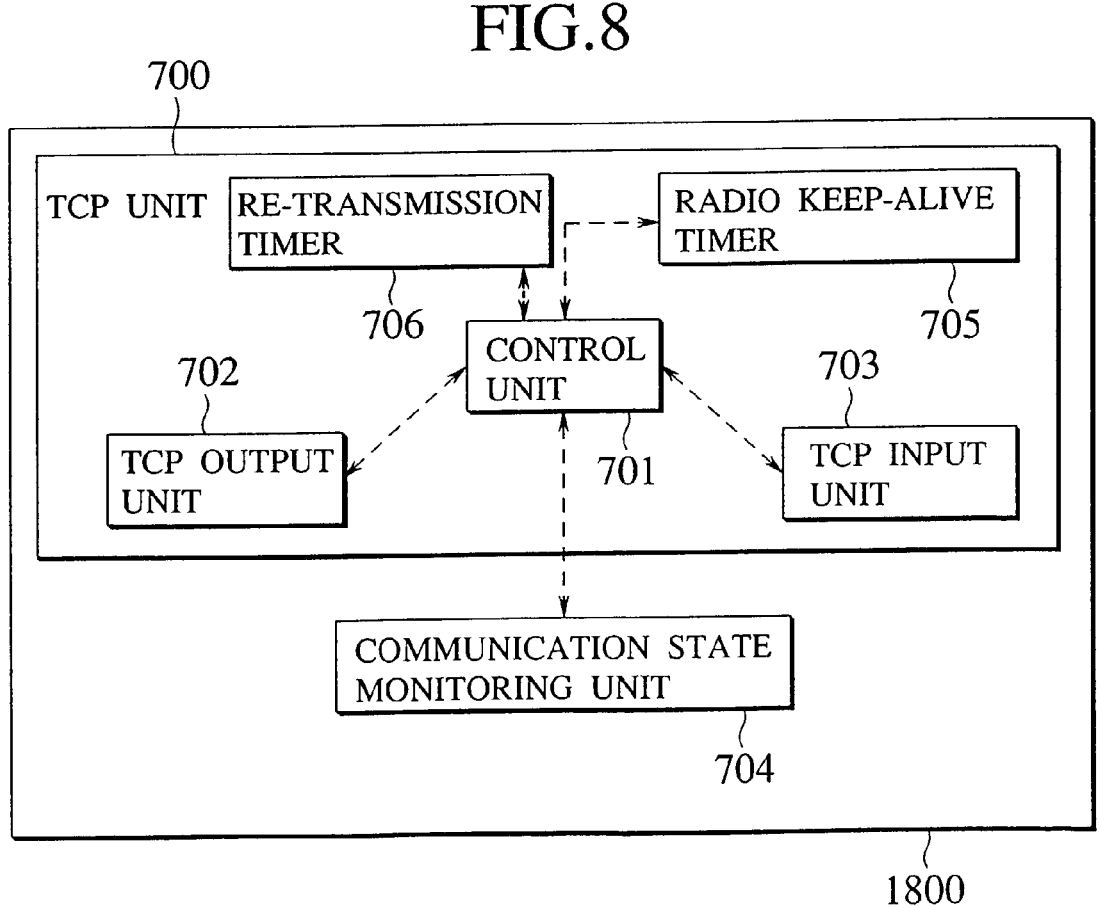

SCHEME FOR ADAPTIVE CONTROL OF TRANSPORT LAYER CONNECTION IN COMMUNICATIONS VIA RADIO AND WIRE NETWORKS

BACKGROUND OF THE INVENTION

1. Field of the Invention

The present invention relates to a gateway device, a radio base station device, a router device and a radio terminal device, which are to be used in radio communications utilizing the transport layer.

2. Description of the Background Art

In recent years there are increasing demands for carrying out not just speech communications but also data communications by radio. TCP (Transmission Control Protocol) is widely used as a reliable transport layer protocol in the wire data communications, but the direct application of this protocol to radio communications causes the following problems.

A TCP segment loss in the wire communications implies the congestion of a network so that TCP is designed to avoid the congestion by lowering a data transmission rate when the segment loss is detected. For this reason, the TCP segment loss due to a radio section error and a handoff will also be interpreted as the congestion so that the congestion avoidance operations will be executed more than necessary and as a result the throughput will be lowered more than necessary.

In order to resolve this problem, there is a proposition to use the usual TCP in a wire network and the radio transport layer in a radio network and relay communications at a border between the wire network and the radio network. For example, "selective ack" is used for a high segment loss rate on the radio network side. Namely, this is a scheme for resolving the congestion problem in such a way that a data loss in the radio section is not regarded as the congestion and a re-transmission is carried out without lowering the transmission rate.

Also, in TCP, when an idle connection state, i.e., a state where no response comes from a terminal on one side and no response comes a terminal on the other side as well, is continued for two hours, a keep-alive packet will be transmitted by a server terminal in which a keep-alive option is set valid. If there is no response to this keep-alive packet which is an inspection packet, the transmission of this keep-alive packet will be continued at 75 seconds interval, but when ten consecutive trials fail, it is judged that a terminal on the client side is inactive and the connection will be disconnected.

As described, in the case of carrying out communications between a radio terminal device accommodated in a radio network and a wire terminal device accommodated in a wire network, the radio terminal and a gateway device for relaying the transport layer protocol cannot directly ascertain the radio communication state of the radio terminal that terminates the transport layer connection, so that there has been a problem that it is impossible realize the adaptive control of the transport layer connection (such as a dynamic change of a segment size) according to the radio communication state or property.

SUMMARY OF THE INVENTION

It is therefore an object of the present invention to provide a communication scheme for improving the performance of communications utilizing the transport layer connection provided via a radio network, by enabling a control of the transport layer connection according to the radio communication state and property of the radio terminal, without changing implementation of the transport layer of a terminal connected to a wire network, so as to resolve the above described problems that arise when a reliable transport layer protocol is applied to a radio network.

Specifically, the present invention provides a gateway device, a radio base station device, a router device, and a radio terminal device for this communication scheme.

According to one aspect of the present invention there is provided a gateway device, comprising: a conversion unit for bidirectionally converting a first transport layer protocol used for communications within a radio network and a second transport layer protocol used for communications within a wire network, in a case of carrying out communications between a radio terminal device accommodated in the radio network and a wire terminal device accommodated in the wire network; and a control unit for controlling a connection in the first transport layer protocol according an information regarding a radio communication state of the radio terminal device.

According to another aspect of the present invention there is provided a router device, to be connected with a plurality of radio base station devices for accommodating a radio terminal device located within radio service areas and a wire network to which a wire terminal device is connected, for carrying out data transfer between the radio terminal device and the wire terminal device, the router device comprising: a correspondence setting unit for bidirectionally converting a first transport layer protocol used for radio communications and a second transport layer protocol used for wire communications in a case of carrying out communications between the radio terminal device and the wire terminal device, and setting the radio terminal device in correspondence to one of a plurality of gateway devices for controlling a transport layer connection in the radio communications according to a radio communication state of the radio terminal device; and a transfer unit for receiving a packet from one radio base station that contains at least identifier of the radio terminal device and an information regarding the radio communication state of the radio terminal device that is located in a radio service area of said one radio base station, and transferring said packet to one gateway device that is set in correspondence to the radio terminal device by the correspondence setting unit.

According to another aspect of the present invention there is provided a radio base station device, comprising: a processing unit for carrying out a base station processing necessary in accommodating a radio terminal device located in a radio service area; and a notification unit for notifying an information regarding a radio communication state of the radio terminal device located in the radio service area, to one of a router, a gateway, and a home location register.

According to another aspect of the present invention there is provided a radio terminal device accommodated in a radio network, the radio terminal device comprising: an acquisition unit for acquiring an information regarding a radio communication state of the radio terminal device; and a disconnection unit for disconnecting a transport layer connection with a radio base station, when communications with the radio base station are not resumed within a prescribed period of time after receiving the information regarding the radio communication state of the radio terminal device which contains a signal indicating that communication with the radio base station are interrupted.

According to another aspect of the present invention there is provided a radio terminal device accommodated in a radio network, the radio terminal device comprising: an acquisition unit for acquiring an information regarding a radio communication state of the radio terminal device; a re-transmission timer for indicating a timing for a packet to be re-transmitted; and a unit for resetting the re-transmission timer and immediately re-transmitting said packet to be re-transmitted, upon receiving the information regarding the radio communication state of the radio terminal device which contains a signal indicating that communications with the radio terminal device are resumed.

Other features and advantages of the present invention will become apparent from the following description taken in conjunction with the accompanying drawings.

BRIEF DESCRIPTION OF THE DRAWINGS

FIG. 3 is a block diagram showing an exemplary configuration of a router device according to the first embodiment of the present invention.

FIG. 7 is a diagram showing an exemplary table content of a radio state information management table in the home location register of FIG. 6.

FIG. 8 is a block diagram showing an exemplary configuration of a radio terminal device according to the fifth embodiment of the present invention.

DETAILED DESCRIPTION OF THE PREFERRED EMBODIMENTS

Referring now to FIG. 1 to FIG. 4, the first embodiment of a communication scheme according to the present invention will be described in detail.

Figure 1:
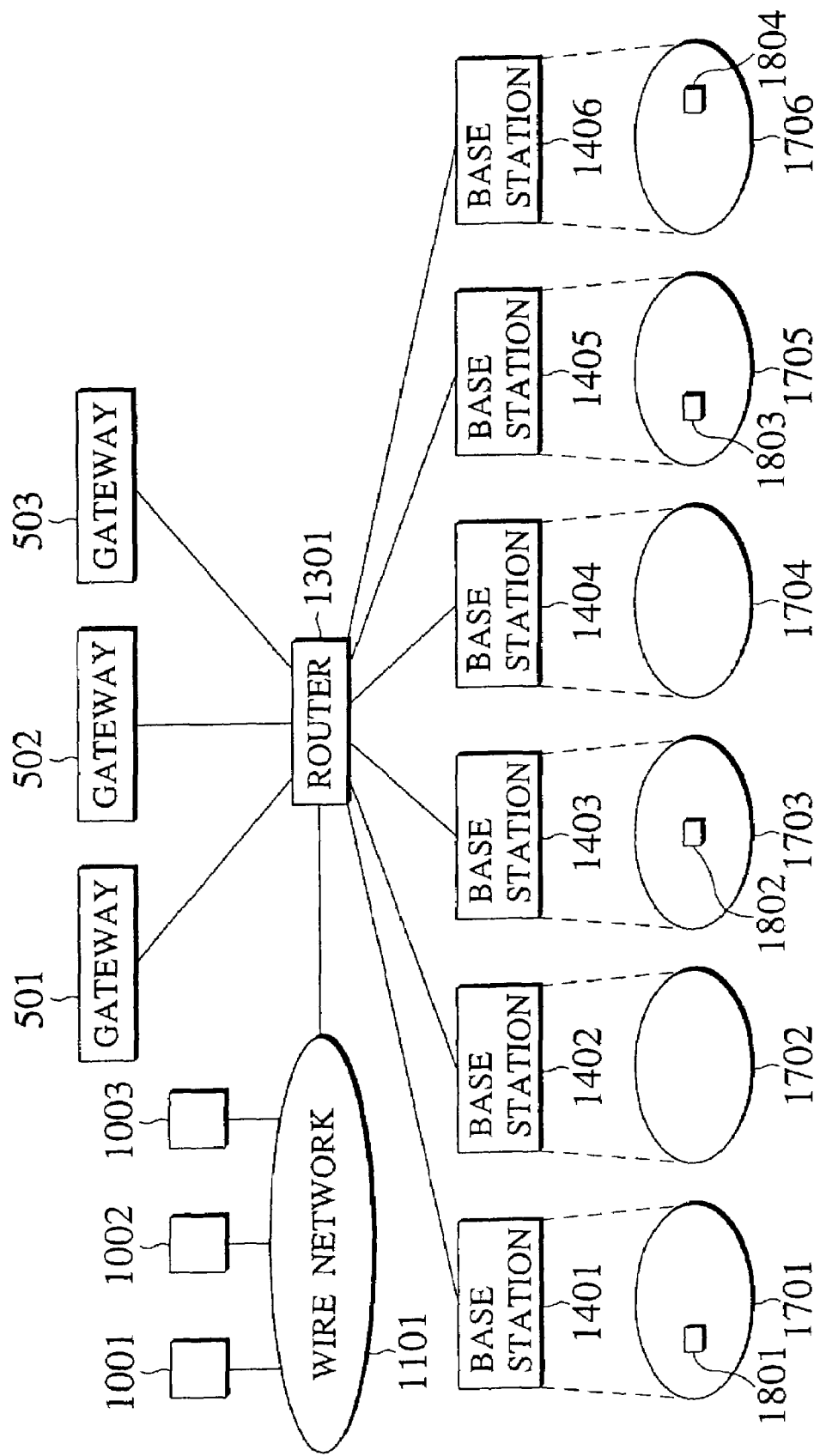
FIG. 1 is a schematic diagram showing an exemplary configuration of a network using communication devices of the present invention.

FIG. 1 shows an exemplary configuration of a network using communication devices (gateway device, router device, base station device) of the present invention. This network of FIG. 1 comprises a wire network 1101, wire terminals 1001 to 1003 connected to the wire network 1101, gateway devices 501 to 503, base station devices 1401 to 1406 covering radio service areas 1701 to 1706 respectively, radio terminal devices 1801 to 1804 which carry out communications while moving through these radio service areas 1701 to 1706, and a router device 1301 for inter-connecting the wire network 1101, the gateway devices 501 to 503 and the base station devices 1401 to 1406.

In the following, an exemplary case of transferring messages by using IP (Internet Protocol) packets and transferring data by using arbitrary transport layer protocol on the network of FIG. 1 will be described.

Figure 2:
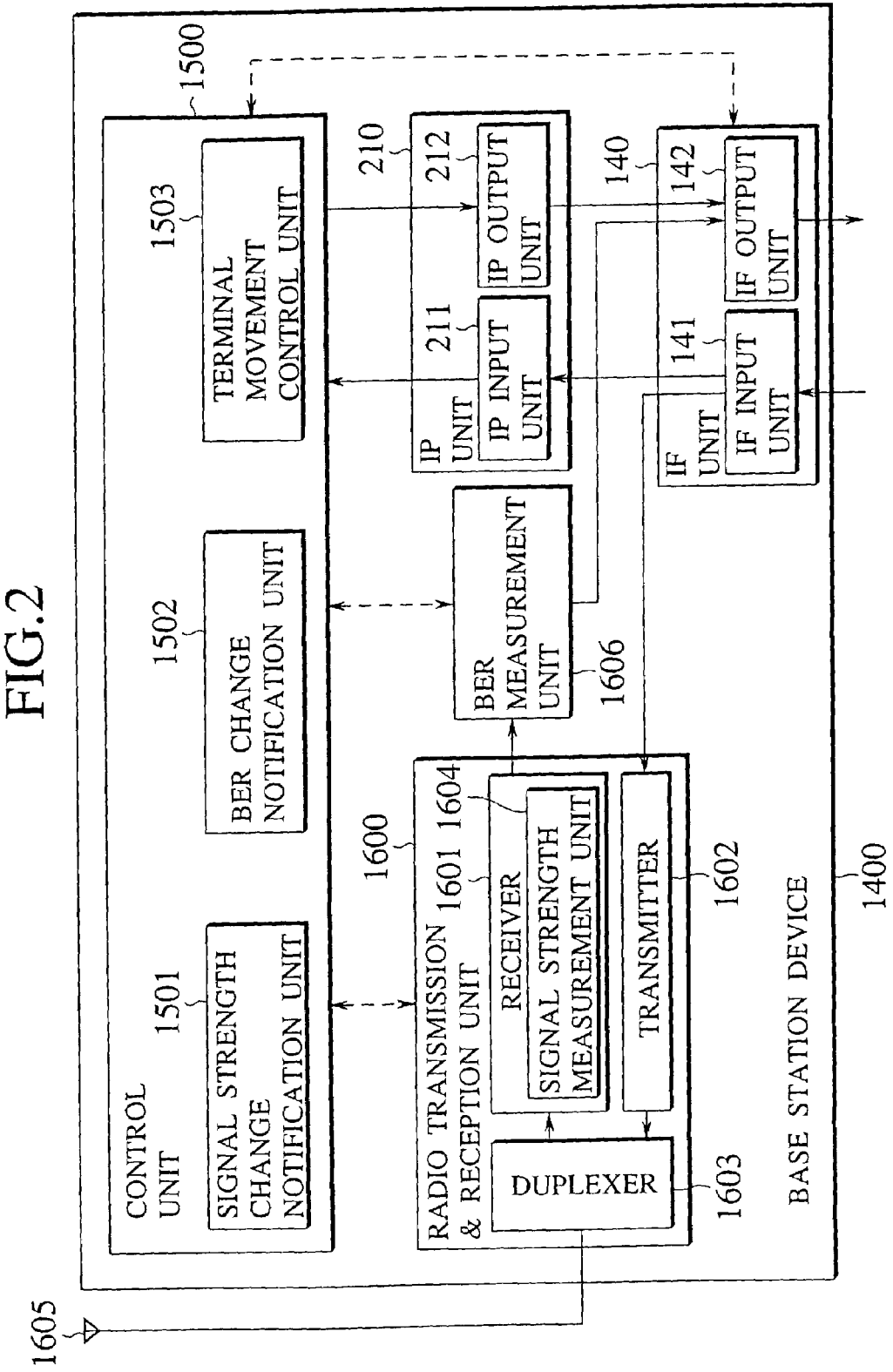
FIG. 2 is a block diagram showing an exemplary configuration of a base station device according to the first embodiment of the present invention.

FIG. 2 shows an exemplary configuration of a base station device 1400 that can be used for each one of the base station devices 1401-1406 of FIG. 1.

This base station device 1400 of FIG. 2 comprises a control unit 1500 having a signal strength change notification unit 1501, a BER (Bit Error Rate) change notification unit 1502 and a terminal movement control unit 1503; a radio transmission and reception unit 1600 having a receiver 1601 that contains a signal strength measurement unit 1604, a transmitter 1602, and a duplexer 1603 for enabling the receiver 1601 and the transmitter 1602 to commonly use an antenna 1605; a BER measurement unit 1606; an IP unit 210 having an IP input unit 211 and an IP output unit 212; and an IF (interface) unit 140 having an IF input unit 141 and an IF output unit 142. In FIG. 2, solid lines indicate data flows while dashed lines indicate control flows.

The signal strength measurement unit 1604 measures a received signal strength for each radio terminal device 1801-1804, and notifies the measured signal strength regularly to the control unit 1500.

The BER measurement unit 1606 measures the BER of signals flowing from the receiver 1601 to the IF output unit 142 for each radio terminal device 1801-1804, and notifies the measured BER regularly to the control unit 1500.

Note here that the received signal strength and the BER are just examples of information indicating a radio communication state between the radio terminal device and the radio base station device.

The signal strength change notification unit 1501 of the control unit 1500 gives a message to the IP output unit 212, where the message has the router device 1301 as its destination and contains the received signal strength for each radio terminal device 1801-1804 obtained by the signal strength measurement unit 1604 and an identifier of a corresponding radio terminal device 1801-1804.

Similarly, the BER change notification unit 1502 of the control unit 1500 gives a message to the IP output unit 212, where the message has the router device 1301 as its destination and contains the BER for each radio terminal device 1801-1804 obtained by the BER measurement unit 1606 and an identifier of a corresponding radio terminal device 1801-1804.

As an identifier, an IP address allocated to each radio terminal device 1801-1804 can be used, for example.

For a message to be transferred to the router device 1301 through the IP output unit 212, a new ICMP (Internet Control Message Protocol) message may be defined. Namely, as an ICMP message for notifying an information indicating the radio communication state such as the received signal strength or the BER and the identifier of the radio terminal device, new type and code can be allocated and a format for information content (the received signal strength or the BER and the identifier of the radio terminal device) can be defined. This message may be notified from the base station device 1400 to the router device 1301 either regularly or only when the received signal strength or the BER exceeds a prescribed threshold.

Figure 3:
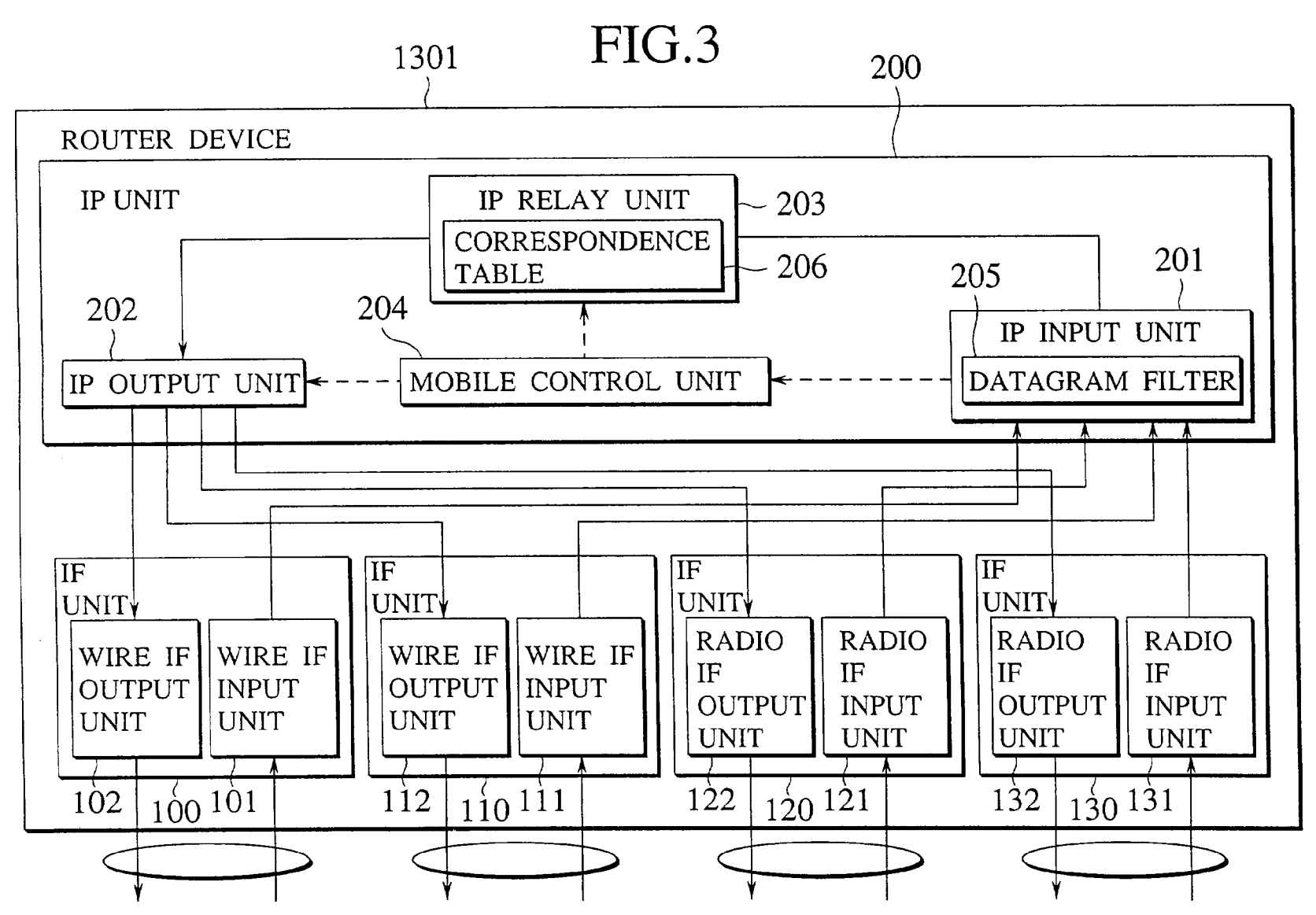

FIG. 3 shows an exemplary configuration of the router device 1301 of FIG. 1. This router device 1301 of FIG. 3 generally comprises a plurality (only two are shown in FIG. 3) of wire IF units 100, 110 which are connected with the wire network 1101 and the gateway devices 501-503 respectively; a plurality (only two are shown in FIG. 3) of radio IF units 120, 130 which are connected with the base station devices 1401-1406 respectively; and an IP unit 200.

Each wire IF unit 100, 110 comprises a wire IF input unit 101, 111 and a wire IF output unit 102, 112, while each radio IF unit 120, 130 comprises a radio IF input unit 121, 131 and a radio IF output unit 122, 132.

The IP unit 200 comprises an IP input unit 201 having a datagram filter 205, an IP output unit 202, an IP relay unit 203 storing a correspondence table 206, and a mobile control unit 204.

The message (ICMP message for example) for notifying the radio communication state that is transmitted from the base station device reaches to the IP input unit 201 via the radio IF input unit 121 or 131. Then, the IP input unit 201 recognizes that this message is an ICMP message for notifying the radio communication state (which can be identified by the type and code of ICMP) by using the datagram filter 205. Then, the IP input unit 201 also recognizes that it is a message (IP datagram) to be transferred to one of the gateway devices 501-503 which is relaying the transport layer connection terminated at the radio terminal device as identified by the identifier contained in that message, and gives it to the IP relay unit 203.

The correspondence table 206 of the IP relay unit 203 indicates a correspondence between IP addresses of the radio terminal devices 1801-1804 and IP addresses of the gateway devices 501-503 which are relaying the transport layer connections terminated at the radio terminal devices 1801-1804.

This correspondence can be established as follows, for example. When the terminal movement control unit 1503 of the base station device 1401-1406 notifies to the mobile control unit 204 of the router device 1301 that the radio terminal device 1801-1804 is newly discovered in one of the radio service areas 1701-1706 (including the case where the radio terminal device turns the power on there), the mobile control unit 204 sets that radio terminal device in correspondence to one of the gateway devices 501-503 according to a prescribed rule.

Now, the IP relay unit 203 obtains the IP address of one of the gateway devices 501-503 that corresponds to the IP address of the radio terminal device contained in that message, from the correspondence table 206. Then, the IP relay unit 203 writes this IP address of the gateway device into an IP header of that message as a new destination of that message, and gives this message to the IP output unit 202.

The IP output unit 202 then transmits this message to one of the gateway devices 501-503 via the wire IF output unit 102 or 112 that corresponds to the destination of that message.

Note that the destination of the message entered into the IP input unit 201 is an address of the router device 1301 so that it should be given to the upper layer normally. Consequently, the above described processing at the IP relay unit 203 (the processing for specifying a gateway device that corresponds to the radio terminal device of the identifier contained in that message by referring to the correspondence table 206 and transferring that message to that identified gateway device) may be carried out at the upper layer. Namely, it is possible to provide a function for processing that message in the upper layer and give that message to this function instead of the IP relay unit 203.

Figure 4:
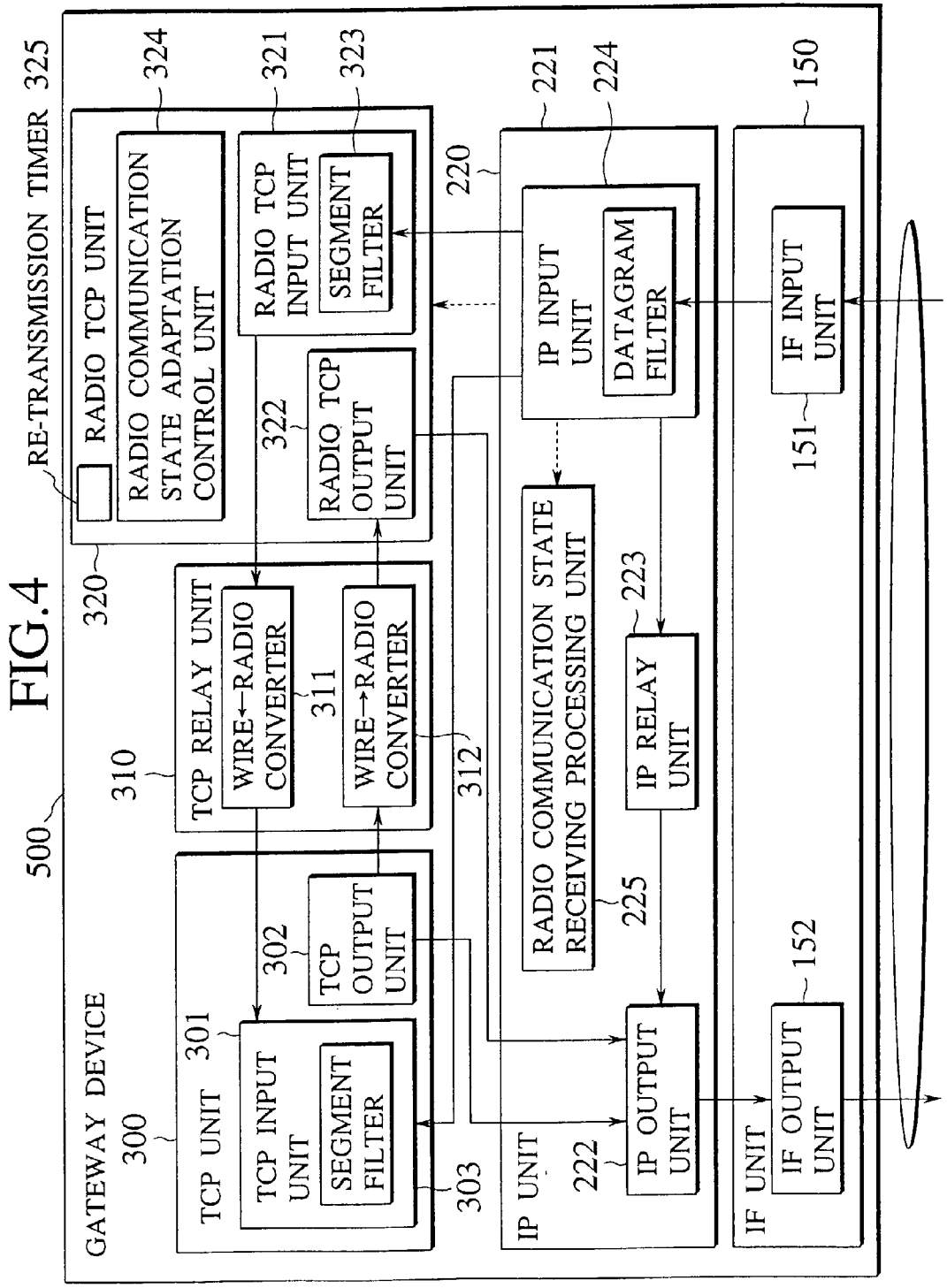
FIG. 4 is a block diagram showing an exemplary configuration of a gateway device according to the first embodiment of the present invention.

FIG. 4 shows an exemplary configuration of a gateway device 500 that can be used for each one of the gateway devices 501-503 of FIG. 1.

This gateway device 500 of FIG. 4 generally comprises an IF unit 150, an IP unit 220, a TCP unit 300, a TCP relay unit 310 and a radio TCP unit 320.

The IF unit 150 comprises an IF input unit 151 and an IF output unit 152 which are connected to the router device 1301.

The IP unit 220 comprises an IP input unit 221 having a datagram filter 224, an IP output unit 222, an IP relay unit 223, and a radio communication state receiving processing unit 225.

The TCP unit 300 comprises a TCP input unit 301 having a segment filter 303 and a TCP output unit 302.

The radio TCP unit 320 comprises a radio TCP input unit 321 having a segment filter 323, a radio TCP output unit 322, and a radio communication state adaptation control unit 324.

The TCP relay unit 310 comprises a converter 311 for converting the radio transport layer protocol into the wire transport layer protocol, and a converter 312 for converting the wire transport layer protocol into the radio transport layer protocol.

The message transferred from the router device 1301 to the gateway device 500 reaches to the IP input unit 221 through the IF input unit 151 of the gateway device 500.

The IP input unit 221 recognizes that the entered message is a message for notifying the radio communication state by using the datagram filter 224, and sends this message to the radio communication state receiving processing unit 225.

The radio communication state receiving processing unit 225 extracts an identifier (IP address) of the radio terminal device and an information regarding the radio communication state (such as the received signal strength or the BER for example) contained in the message, and notifies them to the radio TCP unit 320.

The radio communication state adaptation control unit 324 of the radio TCP unit 320 then adaptively changes the radio TCP operation according to that information regarding the radio communication state. For example, the maximum size of a radio TCP segment to be transmitted is made smaller when the BER becomes higher than a prescribed threshold (or when the received signal strength becomes lower than a prescribed threshold), and the maximum size of a radio TCP segment to be transmitted is made larger when the BER becomes lower than a prescribed threshold (or when the received signal strength becomes higher than a prescribed threshold).

Such a transport layer connection control command (a command for changing the size of a TCP segment, for example) is applied to the radio TCP output unit 322 such that each radio TCP segment that is subsequently transmitted from the converter 312 of the TCP relay unit 310 will have its size changed to the size determined by the radio communication state adaptation control unit 324 at a time of output from the radio TCP output unit 322, and transmitted to the base station device through the IP output unit 222 and the IF output unit 152.

Figure 5:
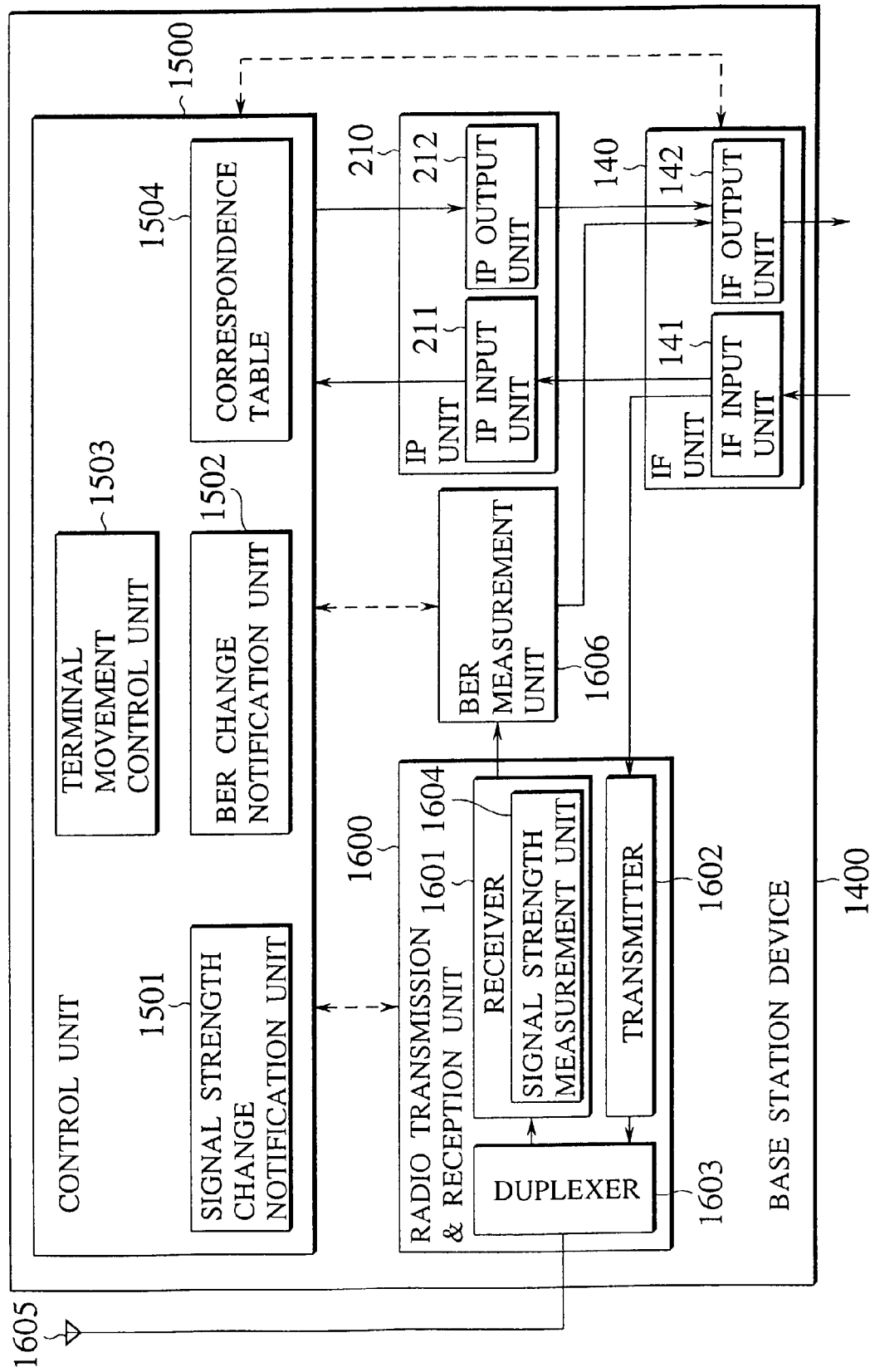
FIG. 5 is a block diagram showing an exemplary configuration of a base station device according to the second embodiment of the present invention.

Referring now to FIG. 5, the second embodiment of a communication scheme according to the present invention will be described in detail.

The first embodiment is directed to the case where the router device 1301 sets the radio terminal device identified by the identifier contained in the message in correspondence to one of the plurality of gateway devices according to the message for notifying the radio communication state that is transmitted from one of the base station devices 1401-1406 to the router device 1301 (the case of specifying a gateway device that is a transfer target of the message for notifying the radio communication state).

In contrast, this second embodiment is directed to the case where the base station device 1401-1406 sets the radio terminal device in correspondence to one of the plurality of gateway devices.

FIG. 5 shows an exemplary configuration of a base station device 1400 according to this second embodiment, that can be used for each one of the base stations 1401-1406 of FIG. 1. Here, the elements that are substantially the same as those of FIG. 2 are given the same reference numerals in FIG. 5 and only differences from FIG. 2 will be described. Namely, the configuration of FIG. 5 differs from that of FIG. 2 in that the control unit 1500 has a correspondence table 1504.

The correspondence table 1504 indicates a correspondence between IP addresses of the radio terminal devices 1801-1804 and IP addresses of the gateway devices 501-503 which are relaying the transport layer connections terminated at the radio terminal devices 1801-1804.

This correspondence can be established as follows, for example. Here, it is assumed that the router device 1301 already has this correspondence in the correspondence table 206 by the procedure described in the first embodiment.

Then, when the terminal movement control unit 1503 of one of the base station devices 1401-1406 notifies to the router device 1301 a message for notifying that one of the radio terminal devices 1801-1804 is newly discovered, the mobile control unit 204 of the router device 1301 searches for an identifier (IP address) of one of the gateway devices 501-503 that is relaying the transport layer connection terminated at the radio terminal device as identified by the identifier (IP address) contained in that received message, by referring to the correspondence table 206. Then, the mobile control unit 204 of the router device 1301 transmits a prescribed response message containing this searched out identifier of the gateway device to the base station device that transmitted the message for noting the discovery of the radio terminal device earlier.

Then, at that base station device, the response message from the router device 1301 is received through the IF input unit 141 and the IP input unit 211, and the identifier of the gateway device is extracted from that response message. Then, the terminal movement control unit 1503 registers a correspondence between that identifier of the gateway device and that radio terminal device in the correspondence table 1504.

On the other hand, the signal strength change notification unit 1501 of the control unit 1500 generates a message containing the received signal strength for that radio terminal device obtained by the signal strength measurement unit 1604 and the identifier of that radio terminal device, and gives this message to the IP output unit 212. At this point, the signal strength change notification unit 1501 searches out the identifier (IP address) of the gateway device that corresponds to the identifier of that radio terminal device from the correspondence table 1504, and sets it as a destination of the generated message.

Similarly, the BER change notification unit 1502 of the control unit 1500 generates a message containing the BER for that radio terminal device obtained by the BER measurement unit 1606 and the identifier of that radio terminal device, and gives this message to the IP output unit 212. At this point, the BER change notification unit 1502 searches out the identifier (IP address) of the gateway device that corresponds to the identifier of that radio terminal device from the correspondence table 1504, and sets it as a destination of the generated message.

When such a message is transmitted to the router device 1301 through the IP output unit 212 and the IF output unit 142, the router device 1301 handles it similarly as the usual IP packet by carrying out the routing to one of the gateway devices 501-503 that is specified by the IP address contained in the IP packet.

The operation of the gateway device 501-503 that received this message is the same as in the first embodiment described above.

Figure 6:
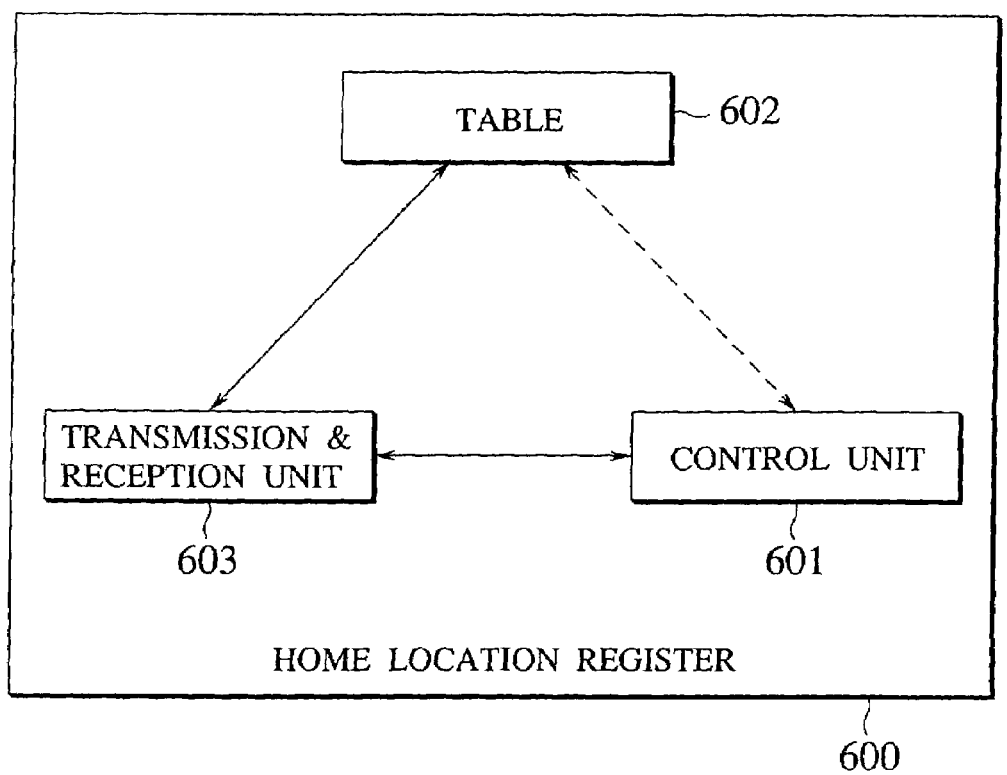
FIG. 6 is a block diagram showing an exemplary configuration of a home location register according to the third embodiment of the present invention.

Referring now to FIG. 6 and FIG. 7, the third embodiment of a communication scheme according to the present invention will be described in detail.

The first and second embodiments are directed to the case where the gateway device 501-503 carries out the radio TCP control by utilizing the message for notifying the radio communication state that is transmitted from the base station device 1401-1406 or the router device 1301.

In contrast, this third embodiment is directed to the case of utilizing a home location register to be provided in a radio network will be described. Here, it is assumed that the base station device has a configuration of FIG. 5 described above.

FIG. 6 shows an exemplary configuration of the home location register 600, which comprises a control unit 601, a radio state information management table 602, and a transmission and reception unit 603.

FIG. 7 shows an exemplary content of the radio state information management table 602 managed by the home location register 600 of FIG. 6. Namely, the home location register 1303 manages a registered radio terminal and a base station that accommodates that radio terminal, and an information on a radio communication state between that radio terminal and that base station, using the table content as shown in FIG. 7 in the radio state information management table 602.

The signal strength change notification unit 1501 of the control unit 1500 in the radio base station 1401-1406 generates a message containing the received signal strength for that radio terminal device obtained by the signal strength measurement unit 1604 and the identifier of that radio terminal device, and gives this message to the IP output unit 212. At this point, the signal strength change notification unit 1501 searches out the identifier (IP address) of that radio terminal device from the correspondence table 1504, and sets it as a part of data of the generated message. Also, the address of the home location register 600 is set as a destination address of the generated message.

Similarly, the BER change notification unit 1502 of the control unit 1500 generates a message containing the BER for that radio terminal device obtained by the BER measurement unit 1606 and the identifier of that radio terminal device, and gives this message to the IP output unit 212. At this point, the BER change notification unit 1502 searches out the identifier (IP address) of that radio terminal device from the correspondence table 1504, and sets it as a part of data of the generated message. Also, the address of the home location register 600 is set as a destination address of the generated message.

When such a message is transmitted to the router device 1301 through the IP output unit 212 and the IF output unit 142, the router device 1301 handles it similarly as the usual IP packet by carrying out the routing to the home location register 600 that is specified by the IP address contained in the IP packet.

When this message is received, the control unit 601 of the home location register 600 takes out the radio terminal identifier and the radio communication state information from that message, and add them to the radio state information management table 602.

On the other hand, when a radio communication notification request packet is transmitted from the gateway device 501-503 to the home location register 600, the control unit 601 takes out the radio communication state of the corresponding radio terminal from the radio state information management table 602, forms a packet containing that information, and transmits that packet to the gateway device 501-503.

The operation of the gateway device 501-503 that received this message is the same as in the first embodiment described above.

Referring now to FIG. 1 and FIG. 4 again, the fourth embodiment of a communication scheme according to the present invention will be described in detail.

In this fourth embodiment, it is assumed that the wire terminal 1001 connected to the wire network 1101 is carrying out communications with the radio terminal 1802 through the gateway device 501.

Upon recognizing a signal indicating that communications with the radio terminal 1802 are interrupted, the radio communication state adaptation control unit 324 in the radio TCP unit 320 of the gateway device 501 sets the radio keep-alive timer (not shown). The time set for this timer is sufficiently shorter than the keep-alive timer usually utilized in the TCP layer.

Then, when the radio keep-alive timer expires before a response from the radio terminal 1802 comes, the radio communication state adaptation control unit 324 carries out the operation to disconnect a connection between the wire terminal 1001 and the radio terminal 1802.

When a packet from the radio terminal 1802 comes after the radio keep-alive timer has expired, the radio communication state adaptation control unit 324 transmits a packet requesting the radio terminal 1802 to carry out the processing for disconnecting the connection.

In this way, it is possible to disconnect the connection within a time shorter than that of the timer that is normally implemented by TCP so that it becomes possible to save the resources.

In addition, when a signal indicating that communications with the radio terminal 1802 are resumed is received by the radio communication state adaptation control unit 324 before the radio keep-alive timer expires, the radio communication state adaptation control unit 324 resets the radio keep-alive timer, while transmitting a signal requesting the radio TCP output unit 322 to reset a re-transmission timer 325 and re-transmit a re-transmission packet immediately.

In this way, it is possible to realize a quick communication resuming so that it is possible to contribute to the throughput improvement.

Referring now to FIG. 8, the fifth embodiment of a communication scheme according to the present invention will be described in detail.

FIG. 8 shows an exemplary configuration of a radio terminal device 1800 that can be used for each one of the radio terminal devices 1801-1804 of FIG. 1.

This radio terminal device 1800 of FIG. 8 comprises a communication state monitoring unit 704 and a TCP unit 700 that contains a control unit 701 for controlling the TCP layer, a TCP output unit 702, a TCP output unit 703, and a radio keep-alive timer 705. The communication state monitoring unit 704 is monitoring whether a link to the base station is connected or not, and notifies the monitored state to the control unit 701 of the TCP unit 700.

Now, suppose that the wire terminal 1001 connected to the wire network 1101 is carrying out communications with the radio terminal 1802 through the gateway device 501.

When a signal indicating that communications with the base station 1403 are interrupted is received from the communication state monitoring unit 704, the control unit 701 in the TCP unit 700 of the radio terminal device 1802 sets the radio keep-alive timer 705. The time set for this timer is sufficiently shorter than the keep-alive timer usually utilized in the TCP layer.

Then, when the radio keep-alive timer 705 expires before a signal indicating that communications are resumed comes from the base station 1401-1406, the control unit 701 carries out the operation to disconnect the connection with the wire terminal 1001.

When a packet comes from the communicating gateway device 501 via the base station 1401-1406 after the radio keep-alive timer 705 has expired, the control unit 701 transmits a packet requesting the gateway device 501 to carry out the processing for disconnecting the connection.

In this way, it is possible to disconnect the connection within a time shorter than that of the timer that is normally implemented by TCP so that it becomes possible to save the resources.

In addition, when a signal indicating that communications with the base station 1401-1406 are resumed is received by the control unit 701 before the radio keep-alive timer 705 expires, the control unit 701 resets the radio keep-alive timer 705, while transmitting a signal requesting the TCP output unit 702 to reset a re-transmission timer 706 and re-transmit a re-transmission packet immediately.

In this way, it is possible to realize a quick communication resuming so that it is possible to contribute to the throughput improvement.

As described, according to the present invention, it is possible to improve the performance of communications utilizing the transport layer connection provided via a radio network, by enabling a control of the transport layer connection according to the radio communication state and property of the radio terminal, without changing implementation of the transport layer of a terminal connected to a wire network.

What is claimed is:

1. A radio terminal device accommodated in a radio network, the radio terminal device comprising:
   an acquisition unit for acquiring an information which indicates that communications with the radio base station will be interrupted; and
   a disconnection unit for disconnecting a transport layer connection with a radio base station, when communications with the radio base station are not resumed within a prescribed period of time after receiving the information.

2. The radio terminal device of claim 1, wherein the disconnection unit also disconnects a connection used by a correspondent terminal when a packet comes from the correspondent terminal that was carrying out communication using the transport layer connection after the transport layer connection is disconnected.

3. A radio terminal device accommodated in a radio network, the radio terminal device comprising:
   an acquisition unit for acquiring an information which indicates that communications with the radio terminal device will be resumed;
   a re-transmission timer for indicating a timing for a packet to be re-transmitted; and
   a unit for resetting the re-transmission timer and immediately re-transmitting said packet to be re-transmitted, upon receiving the information.

* * * * *